United States Patent
Tolbert et al.

(10) Patent No.: US 7,463,734 B2
(45) Date of Patent: Dec. 9, 2008

(54) DISPLAY WINDOW COVER ASSEMBLIES AND ELECTRONIC DEVICES AND METHODS USING THE SAME

(75) Inventors: William Tolbert, Malmö (SE); Stjepan Begic, Bunkeflostrand (SE)

(73) Assignee: Sony Ericsson Mobile Communications AB, Lund (SE)

(*) Notice: Subject to any disclaimer, the term of this patent is extended or adjusted under 35 U.S.C. 154(b) by 95 days.

(21) Appl. No.: 11/410,553

(22) Filed: Apr. 25, 2006

(65) Prior Publication Data

US 2007/0202933 A1 Aug. 30, 2007

Related U.S. Application Data

(60) Provisional application No. 60/764,921, filed on Feb. 3, 2006.

(51) Int. Cl.
*H04M 1/00* (2006.01)
*H04M 9/00* (2006.01)
(52) U.S. Cl. .......... 379/433.04; 379/440; 455/575.1
(58) Field of Classification Search ........... 379/433.01, 379/428.01, 433.04, 437, 440; 313/479; 428/426; 455/90.3, 575.1, 575.8
See application file for complete search history.

(56) References Cited

U.S. PATENT DOCUMENTS 3,973,343 A * 8/1976 Tolfsen .................. 40/790
5,763,089 A    6/1998 Chaussade et al.
5,766,755 A    6/1998 Chaussade et al.
5,811,923 A *  9/1998 Zieba et al. ............. 313/479
6,259,491 B1   7/2001 Ekedahl et al.
6,592,969 B1   7/2003 Burroughes et al.
2002/0197487 A1 12/2002 Bier et al.

FOREIGN PATENT DOCUMENTS

EP     1 486 935 A1   12/2004
GB       1053220 A    12/1996
WO    WO 92/16889 A   10/1992
WO    WO 01/53074 A2   7/2001

OTHER PUBLICATIONS

International Search Report and the Written Opinion of the International Searching Authority for PCT Application No. PCT/US2006/028049 mailed Dec. 14, 2006.

* cited by examiner

*Primary Examiner*—Curtis Kuntz
*Assistant Examiner*—Tuan D Nguyen
(74) *Attorney, Agent, or Firm*—Myers Bigel Sibley & Sajovec (57) ABSTRACT

An electronic device has a display window and includes a composite display window cover assembly and a display device. The composite display window cover assembly is disposed in the display window. The composite display window cover assembly includes a glass panel and a plastic panel secured to the glass panel. The display device is positioned to be viewed through the display window and the composite display window cover assembly.

21 Claims, 5 Drawing Sheets

DISPLAY WINDOW COVER ASSEMBLIES AND ELECTRONIC DEVICES AND METHODS USING THE SAME

RELATED APPLICATION

The present application claims the benefit of U.S. Provisional Patent Application Ser. No. 60/764,921, filed Feb. 3, 2006, the disclosure of which is hereby incorporated herein by reference in its entirety.

FIELD OF THE INVENTION

The present invention relates to electronic devices and, more particularly, to electronic devices including display windows and methods using the same.

BACKGROUND OF THE INVENTION

Mobile terminals such as cellular telephones typically include a display including a liquid crystal display (LCD) and an overlying display window cover. Some such window covers are formed of plastic, which may suffer from poor scratch resistance. Glass window covers have also been employed. Glass window covers may provide improved scratch resistance, but may suffer from drawbacks in cost, breakage (e.g., shatter resistance), and manufacturability. To address breakage concerns, thin (typically, with a thickness of between about 0.05 and 0.20 mm), plastic "anti-splinter" film has been adhesively laminated to glass window covers.

SUMMARY OF THE INVENTION

According to embodiments of the present invention, an electronic device has a display window and includes a composite display window cover assembly and a display device. The composite display window cover assembly is disposed in the display window. The composite display window cover assembly includes a glass panel and a plastic panel secured to the glass panel. The display device is positioned to be viewed through the display window and the composite display window cover assembly.

According to some embodiments, the plastic panel has a thickness of at least about 0.30 mm. According to some embodiments, the plastic panel is formed of a polymeric material having a Young's Modulus of at least about 1.8 GPa.

According to some embodiments, the plastic panel is interposed between the glass panel and the display device. According to some embodiments, the plastic panel is laminated to the glass panel.

According to further embodiments of the present invention, a composite display window cover assembly for an electronic device having a display window includes a glass panel and a plastic panel laminated to the glass panel. The plastic panel has a border portion that extends laterally beyond a peripheral edge of the glass panel. According to some embodiments, the plastic panel includes at least one integral mounting feature.

According to method embodiments of the present invention, a method for forming an electronic device includes mounting a composite display window cover assembly in a display window of a housing such that the composite display window cover assembly overlies a display unit in the housing and the display unit is viewable through the composite display window cover assembly, wherein the composite display window cover assembly includes a glass panel and a plastic panel secured to the glass panel. The method may further include laminating the plastic panel to the glass panel.

Further features, advantages and details of the present invention will be appreciated by those of ordinary skill in the art from a reading of the figures and the detailed description of the preferred embodiments that follow, such description being merely illustrative of the present invention.

DETAILED DESCRIPTION OF EMBODIMENTS OF THE INVENTION

The present invention now will be described more fully with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout.

As used herein, the term "comprising" or "comprises" is open-ended, and includes one or more stated features, integers, elements, steps, components or functions but does not preclude the presence or addition of one or more other features, integers, elements, steps, components, functions or groups thereof.

As used herein, the term "and/or" includes any and all combinations of one or more of the associated listed items.

As used herein, the common abbreviation "e.g.", which derives from the Latin phrase "exempli gratia," may be used to introduce or specify a general example or examples of a previously mentioned item, and is not intended to be limiting of such item. If used herein, the common abbreviation "i.e.", which derives from the Latin phrase "id est," may be used to specify a particular item from a more general recitation.

The terminology used herein is for the purpose of describing particular embodiments only and is not intended to be limiting of the invention. As used herein, the singular forms "a", "an" and "the" are intended to include the plural forms as well, unless the context clearly indicates otherwise.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In addition, spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly.

It will be understood that when an element is referred to as being "coupled" or "connected" to another element, it can be directly coupled or connected to the other element or intervening elements may also be present. In contrast, when an element is referred to as being "directly coupled" or "directly connected" to another element, there are no intervening elements present. Furthermore, "coupled" or "connected" as used herein may include wirelessly coupled or connected.

Well-known functions or constructions may not be described in detail for brevity and/or clarity.

As used herein, "electronic component" means an active device as contrasted with a passive electrical connector or the like. An electronic component may include a processor.

As used herein, a "communication terminal" includes, but is not limited to, a terminal that is configured to receive/transmit communication signals via a wireline connection, such as via a public-switched telephone network (PSTN), digital subscriber line (DSL), digital cable, or another data connection/network, and/or via a wireless interface with, for example, a cellular network, a satellite network, a wireless local area network (WLAN), and/or another communication terminal.

When the communication terminal is configured to communicate over a wireless interface, it is referred to herein as a "wireless communication terminal" or a "wireless terminal." Examples of wireless terminals include, but are not limited to, a cellular telephone, personal data assistant (PDA), pager, and/or a computer that is configured to communicate data over a wireless communication interface that can include a cellular telephone interface, a Bluetooth interface, a wireless local area network interface (e.g., 802.11), another RF communication interface, and/or an optical/infra-red communication interface.

As used herein, "mobile terminals" may be portable, transportable, installed in a vehicle (aeronautical, maritime, or land-based), or situated and/or configured to operate locally and/or in a distributed fashion at any other location(s) on earth and/or in space.

Embodiments of the present invention will now be described below with respect to FIGS. 1-7. Embodiments of the present invention provide a composite display window cover. The display window cover may provide improvements and advantages in performance and/or manufacture over conventional display window covers. According to some embodiments, the electronic device is a mobile terminal.

Figure 1:
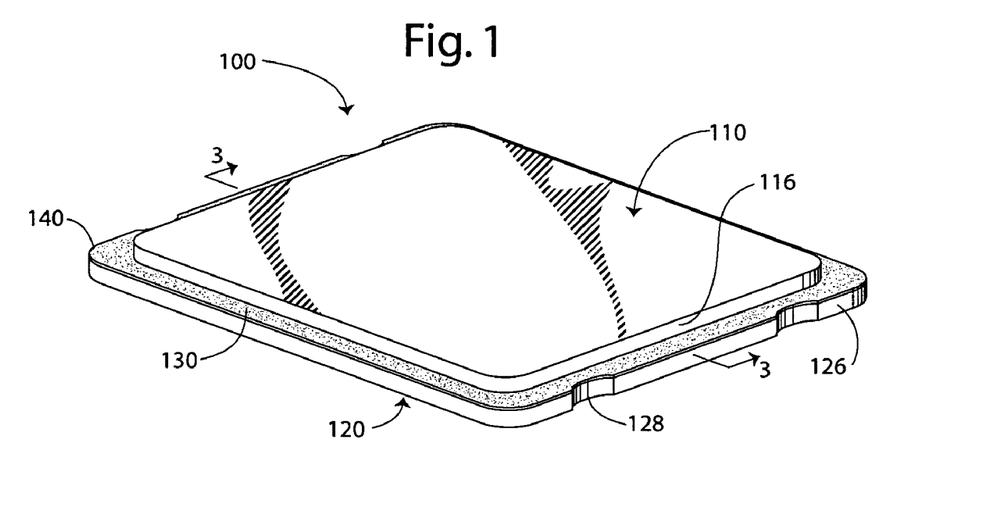
FIG. 1 is perspective view of a display window cover assembly according to embodiments of the present invention.
Figure 2:
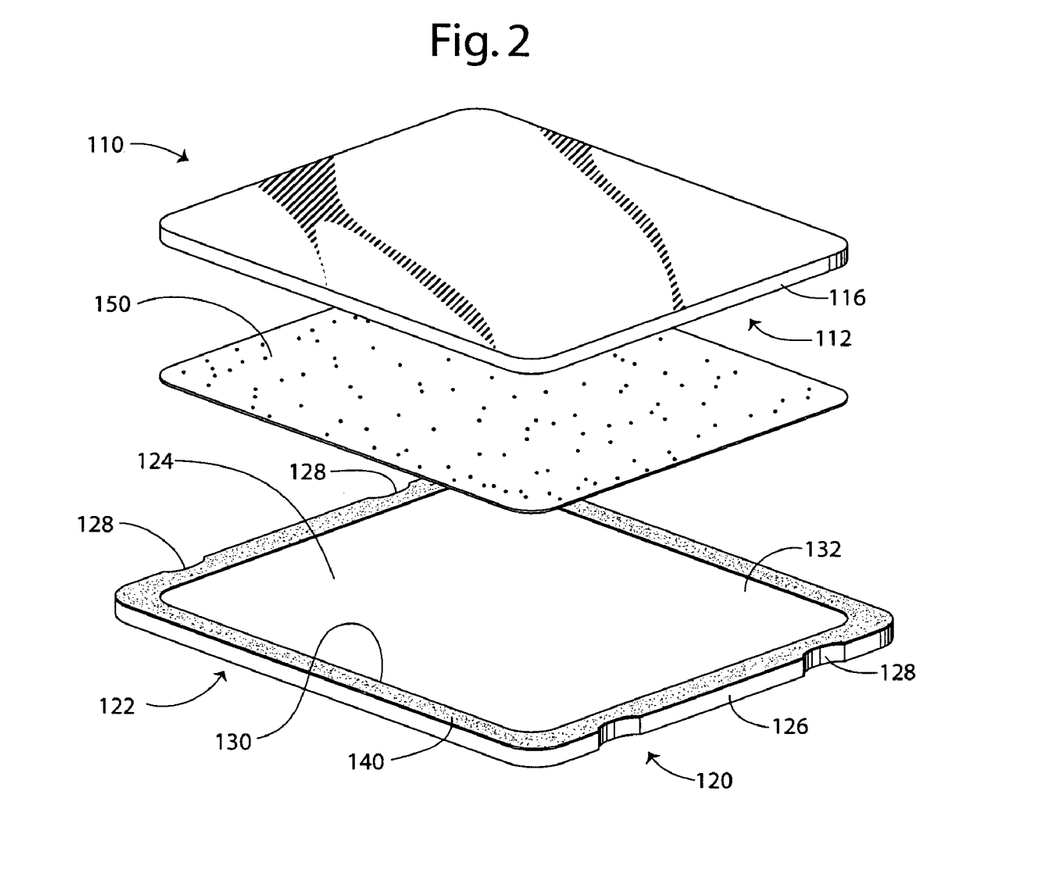
FIG. 2 is an exploded, perspective view of the display window cover assembly of FIG. 1.
Figure 3:
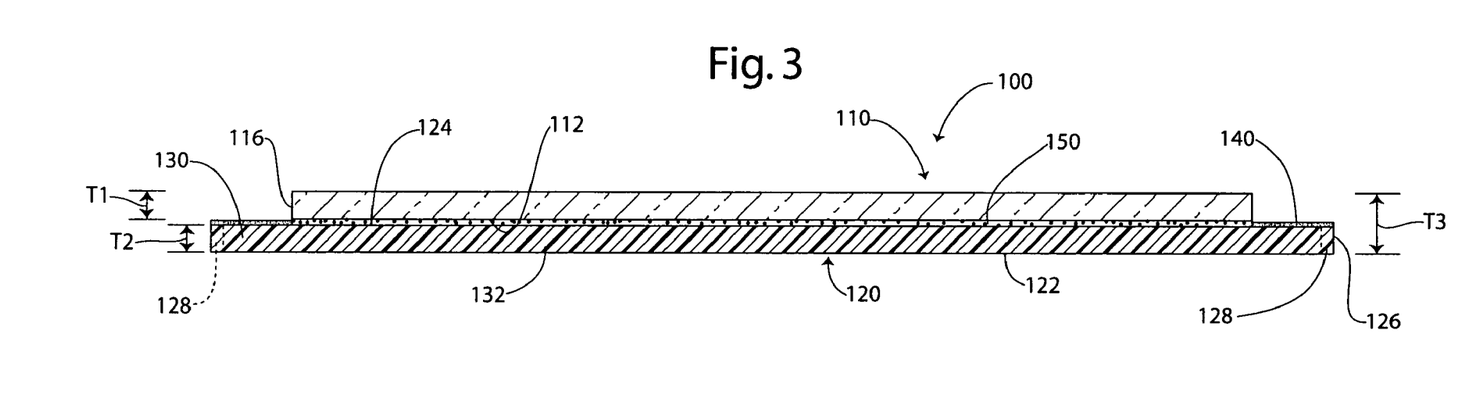
FIG. 3 is a cross-sectional view of the display window cover assembly of FIG. 1 taken along the line 3-3 of FIG. 1.

Embodiments of the present invention are illustrated in FIGS. 1-3, wherein a composite display window cover assembly 100 is shown. The composite display window cover assembly 100 includes a glass sheet or panel 110, a plastic (i.e., polymeric) sheet or panel 120, and a layer of adhesive 150 (FIG. 3).

The plastic panel 120 has a rear surface 122 and an opposing front surface 124. The plastic panel 120 further includes a peripheral edge defining a plurality of recesses 128. The recesses 128 may be adapted to receive mounting features of the device in which the assembly 100 is to be mounted. A border portion 130 surrounds an interior or main portion 132. A coating layer 140 is disposed on the front surface of the border portion 130. Alternatively or additionally, such a coating may be disposed on the rear surface. The coating 140 may be a decorative, cosmetic and/or functional layer. For example, the coating may be an opaque or semi-opaque coating.

The glass panel 110 has a peripheral edge 116 and a rear surface 112. The glass panel 110 is positioned on the front surface 124 of the plastic panel 120 such that the glass panel 110 overlies the interior portion 132 and the border portion 130 extends outwardly beyond the peripheral edge 116. The glass panel 110 is secured in place by the adhesive 150, which is interposed between the rear surface 112 and the front surface 124. According to some embodiments, the layer of adhesive is coextensive with the overlap between the panels 110, 120.

The glass panel 110 may be formed of any suitable translucent glass material having suitable optical properties. According to some embodiments, the glass panel 110 is formed of a chemically hardened glass. According to some embodiments, the glass panel 110 is formed of a material having a pencil hardness of at least 8 H and, according to some embodiments, at least 9 H. The glass panel 110 may be formed by any suitable method.

The plastic panel 120 may be formed of any suitable translucent polymeric material having suitable optical properties. According to some embodiments, the plastic panel 120 is formed of polycarbonate and/or acrylic (e.g., PMMA). According to some embodiments, the plastic panel 120 is formed of a material that is rigid or semi-rigid at room temperature. According to some embodiments, the plastic panel 120 is formed of a material having a Young's modulus of at least about 1.8 GPa. According to some embodiments, the plastic panel 120 is formed of a material having a Young's Modulus of between about 1.8 and 2.8 GPa. The plastic panel 120 can be formed using any suitable technique. For example, the plastic panel 120 may be extruded and cut and/or molded. Mounting features and the like may be formed in the plastic panel 120 using any suitable technique.

The adhesive 150 may be any suitable adhesive having suitable optical performance. Suitable adhesives may include 3M Optically Clear Laminating Adhesive Product No. 8141. According to some embodiments, the adhesive 150 has a thickness of between about 0.025 and 0.125 mm.

The coating 140 may be formed of any suitable material, such as those materials conventionally employed for decorating plastic display window covers. Suitable coating materials may include screen printed ink, spray coated paint or lacquer, or vacuum deposited metals.

According to some embodiments, the glass panel 110 and the plastic panel are 120 are each separately formed and then laminated together with the adhesive 150. Before or after laminating the panels 110, 120, the coating 140 and/or other features may be printed on or otherwise applied to, formed in, or mounted on the plastic panel 120. For example, the coating 140 and/or various machining or molding processes may be applied to a plurality of plastic panels embodied in a single plastic panel, which is then cut to form the several plastic panels 120. The adhesive may be provided as a liquid optical resin or a solid or semi-solid sheet of adhesive that is cured in situ between the panels 110, 120 (e.g., by heat, UV exposure, time, and/or pressure).

According to some embodiments, the glass panel 110 has a thickness T1 (FIG. 3) in the range of from about 0.1 to 5 mm. According to some embodiments, the thickness T1 is in the range of from about 0.5 to 3 mm.

According to some embodiments, the plastic panel 120 has a thickness T2 (FIG. 3) of at least about 0.30 mm. According to some embodiments, the thickness T2 is in the range of from about 0.35 to 2 mm. According to some embodiments, the thickness T2 is in the range of from about 0.5 to 1 mm.

According to some embodiments, the cover assembly 100 has an overall thickness T3 (FIG. 3) in the range of from about 0.45 to 5 mm. According to some embodiments, the thickness T2 is in the range of from about 1 to 1.5 mm.

Display window cover assemblies of the present invention may be incorporated into an electronic device such as a communication terminal. According to some embodiments, the display window cover is incorporated into a mobile communication terminal. According to some embodiments, the display window cover is incorporated into a wireless communication terminal such as a cellular telephone, which may be a mobile wireless communication terminal. In particular, the mobile terminal may be a handheld terminal. An exemplary mobile wireless communication terminal 10 including the display window cover 100 is shown in FIGS. 4-7.

Figure 4:
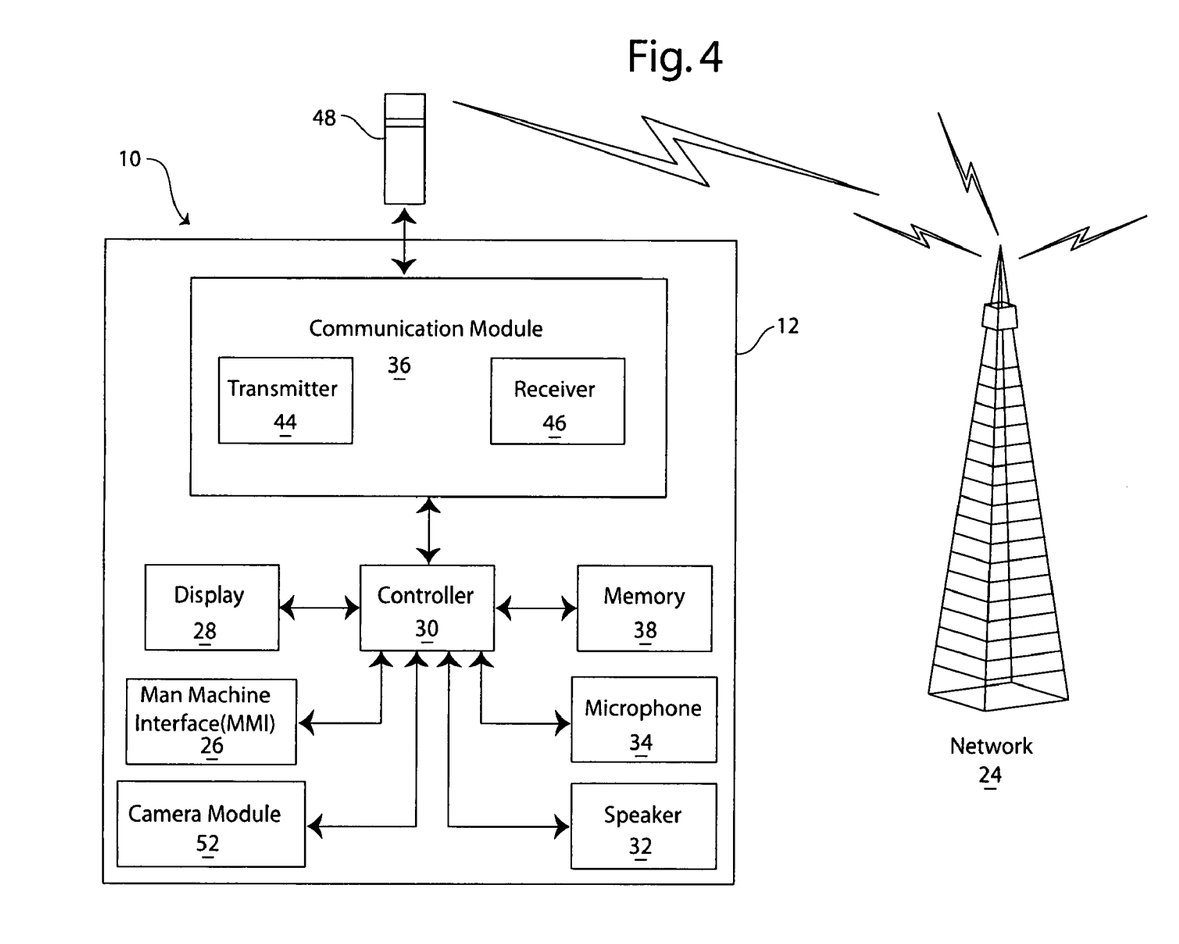
FIG. 4 is a schematic diagram of a mobile terminal according to embodiments of the present invention and an exemplary base station transceiver.

Referring now to FIG. 4, an exemplary radiotelephone communication system in accordance with embodiments of the present invention is illustrated, which includes the mobile wireless communication terminal 10 and a base station transceiver, which is part of a wireless communications network 24. In some embodiments of the present invention, the network 24 includes a base station transceiver that includes the radio transceiver(s) that define an individual cell in a cellular network and communicates with the mobile terminal 10 and other mobile terminals in the cell using a radio-link protocol. It will be understood that, in some embodiments of the present invention, many base station transceivers may be connected through, for example, a mobile switching center and other devices to define a wireless communications network.

The mobile terminal 10 includes a portable housing assembly 12 and a man machine interface (MM) 26. The mobile terminal 10 also includes a display device or unit 28, a speaker 32, a microphone 34, a transceiver or communication module 36, and a memory 38 including application information and parameters, any of which may communicate with a processor or controller 30. Furthermore, the mobile terminal 10 according to embodiments of the present invention may further include a digital camera module 52, which also communicates with the controller 30. Other user interface devices may be provided such as other suitable input device(s).

The speaker 32 generates sound responsive to an input audio signal. The microphone 34 is coupled to an audio processor that is configured to generate an audio data stream responsive to sound incident on the microphone. The display device 28 may include, for example, a liquid crystal display (LCD) module.

The communication module 36 can include a cellular communication module, a direct point-to-point connection module, and/or a WLAN module. With a cellular communication module, the wireless terminal 10A can communicate via the base station(s) of the network using one or more cellular communication protocols such as, for example, Advanced Mobile Phone Service (AMPS), ANSI-136, Global Standard for Mobile (GSM) communication, General Packet Radio Service (GPRS), enhanced data rates for GSM evolution (EDGE), code division multiple access (CDMA), wideband-CDMA, CDMA2000, and Universal Mobile Telecommunications System (UMTS). The cellular base stations may be connected to a Mobile Telephone Switching Office (MTSO) wireless network, which, in turn, can be connected to a PSTN and/or another network.

The communication module 36 may include a transceiver typically having a transmitter circuit 44 and a receiver circuit 46, which respectively transmit outgoing radio frequency signals (e.g., to the network 24, a router or directly to another terminal) and receive incoming radio frequency signals (e.g., from the network 24, a router or directly from another terminal), such as voice and data signals, via an antenna 48. The communication module 36 may include a short-range transmitter and receiver, such as a Bluetooth transmitter and receiver. The antenna 48 may be an embedded antenna, a retractable antenna or any antenna known to those having skill in the art without departing from the scope of the present invention. The radio frequency signals transmitted between the mobile terminal 10 and the network 24 may include both traffic and control signals (e.g., paging signals/messages for incoming calls), which are used to establish and maintain communication with another party or destination. The radio frequency signals may also include packet data information, such as, for example, cellular digital packet data (CDPD) information. In addition, the transceiver may include an infrared (IR) transceiver configured to transmit/receive infrared signals to/from other electronic devices via an IR port.

The controller 30 may support various functions of the mobile terminal 10. The controller 30 can be any commercially available or custom microprocessor, for example. In use, the controller 30 of the mobile terminal 10 generates a display image on the display device 28.

The foregoing components of the mobile terminal 10 may be included in many conventional mobile terminals and their functionality is generally known to those skilled in the art. As used herein, the term "portable electronic device" or "mobile terminal" may include: a cellular radiotelephone with or without a multi-line display; a Personal Communications System (PCS) terminal that may combine a cellular radiotelephone with data processing, facsimile and data communications capabilities; a Personal Data Assistant (PDA) that can include a radiotelephone, pager, Internet/intranet access, Web browser, organizer, calendar and/or a global positioning system (GPS) receiver; a gaming device, an audio video player, and a conventional laptop and/or palmtop portable computer that may include a radiotelephone transceiver.

Figure 5:
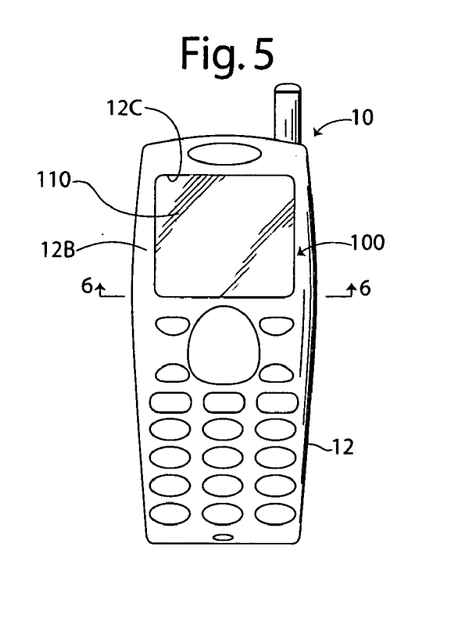
FIG. 5 is a front view of the mobile terminal of FIG. 4.
Figure 6:
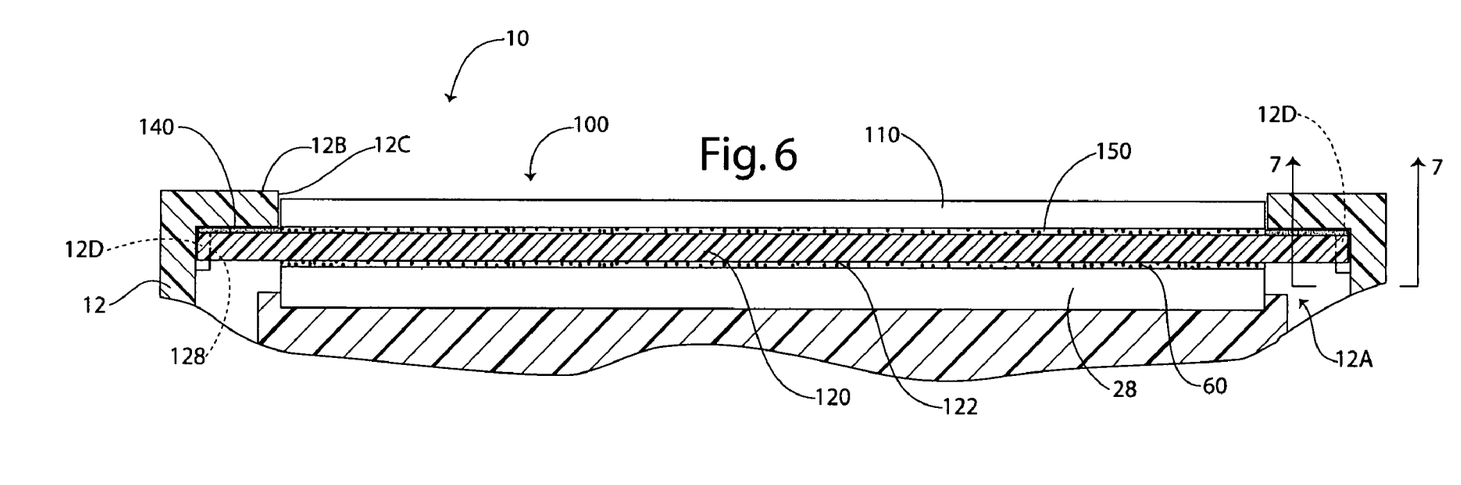
FIG. 6 is an enlarged, fragmentary, cross-sectional view of the mobile terminal of FIG. 5 taken along the line 6-6 of FIG. 5.
Figure 7:
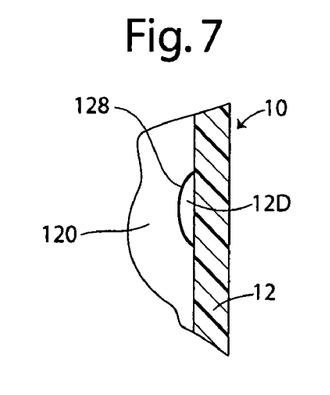
FIG. 7 is an enlarged, fragmentary, cross-sectional view of the mobile terminal of FIG. 5 taken along the line 7-7 of FIG. 6.

According to some embodiments and as illustrated in FIGS. 5-7, the mobile terminal 10 is a handheld (portable) mobile terminal. By "handheld mobile terminal," it is meant that the outer dimensions of the mobile terminal are adapted and suitable for use by a typical operator using one hand. According to some embodiments, the total volume of the handheld mobile terminal is less than about 200 cc. According to some embodiments, the total volume of the handheld terminal is less than about 100 cc. According to some embodiments, the total volume of the handheld mobile terminal is between about 50 and 100 cc. According to some embodiments, no dimension of the handheld mobile terminal 10 exceeds about 200 mm.

The housing 12 defines an interior cavity 12A and has a front wall 12B. A window 12C is defined in the front wall 12B. The housing 12 may be formed of a polymeric material, such as polycarbonate or ABS. Alternatively or additionally, the housing 12 may be formed of any other suitable material, such as metal. The housing 12 may be molded and may be assembled from multiple parts. While the mobile terminal 10 as shown is of a generally one-piece design, it is also contemplated that it may include two or more subhousings joined by a hinge or other suitable mechanism(s) to allow for relative movement between the housings. For example, the mobile terminal 10 may include a pair of subhousings hinged to form a clamshell housing. Handheld wireless communication terminals having clamshell housings are commonly referred to as "flip phones."

Referring to FIGS. 6 and 7, the cover assembly 100 is shown therein mounted in the housing 12. As shown, the rear surface 122 of the plastic panel 120 is directly adhered to the LCD module 28 by a layer of adhesive 60. For example, the plastic panel 120 may be directly adhered to a plastic polarizer layer of the LCD module 28. The adhesive 60 may be an adhesive as described above for the adhesive 150. The cover assembly 100 may also be positioned and/or secured in place by integral projections 12D formed on the housing 12 that are received in the recesses 128 of the plastic panel 120 (FIG. 7). Additionally or alternatively, the projections 12D may be screw bosses or the like and the recesses 128 may provide clearance therefor. In the illustrated embodiment, the glass panel 110 is received in the window 12C such that the glass panel 110 fits substantially flush with the front of the housing 12 and the oversized plastic panel 120 is recessed within the housing 12.

When the mobile terminal 10 is assembled as described, the LCD module 28 and the images provided thereby will be viewable by a user through the window 12C and the panels 110, 120 of the cover assembly 100. The glass panel 110 is exposed and the plastic panel 120 is interposed between the glass panel 110 and the LCD module 28. The border portion 130 underlaps the housing front wall 12B. The coating 140 may provide a cosmetic opaque border to improve the appearance of the transition between the glass panel 110 and the front wall 12B. The recesses 128 may serve as integral mounting features to secure and/or position the cover assembly 100 in place in the housing 12.

The illustrated cover assembly 100 and mobile terminal 10 are exemplary of embodiments of the present invention and various modifications are contemplated. The panels 110, 120 may be differently overlapped and shaped. For example, the glass panel 110 may extend beyond the panel 120 or the panels 110, 120 may be coextensive. The panels 110, 120 may be non-planar panels or sheets. More than one glass panel and/or more than one plastic panel may be provided.

The panels 110, 120 may be laminated by techniques other than using adhesive. According to some embodiments, the panels 110, 120 may not be directly secured to one another, but may be independently mounted in the device and or held together by a mechanical device or devices.

Integral mounting features other than the recesses 128 may be provided in the plastic panel 120, for example, by embedding, molding, and/or machining. For example, integral interlock or snap-fit mounting features may be formed on the plastic panel 120. Integral mounting posts and/or bores may be provided on/in the plastic panel 120 to engage complementary features (e.g., mounting holes or posts) of the housing 12 or other components.

It will thus be appreciated that the plastic panel 120 may be provided with features that serve to facilitate mounting of the cover assembly in the device. Accordingly, in addition or as an alternative to adhering the plastic panel 120 directly to the LCD module 28, other techniques may be employed for mounting the cover assembly 100. For example, the plastic panel 120 can be welded (e.g., ultrasonically welded), heat staked, taped, adhered, or mechanically coupled to the housing (which may also be plastic) or other component(s). The plastic panel 120 can be directly secured to the housing. According to some embodiments, the plastic panel 120 is directly ultrasonically welded to the housing.

Figure 8:
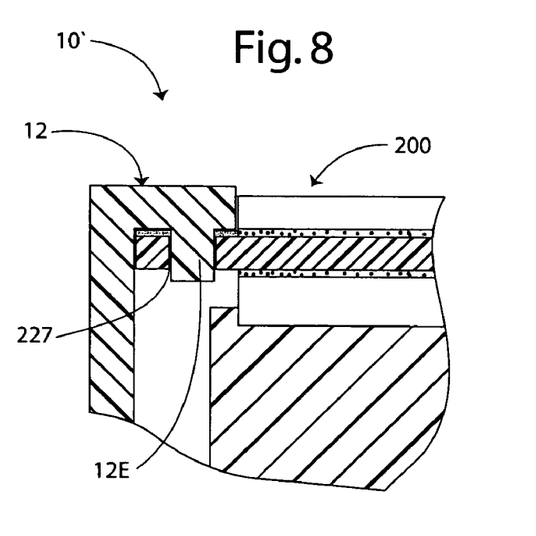
FIG. 8 is an enlarged, fragmentary, cross-sectional view of a mobile terminal according to further embodiments of the present invention.

For example and with reference to FIG. 8, a mobile terminal 10' according to further embodiments of the invention is shown therein. The mobile terminal 10' corresponds to the mobile terminal 10 except that the mobile terminal 10' further includes a mounting post 12E forming a part of the housing 12 and the cover assembly 100 is replaced with a composite window cover assembly 200. The cover assembly 200 corresponds to the cover assembly 100 except that the cover assembly 200 includes a mounting hole 227 that receives the mounting post 12E therethrough to secure and/or position the cover assembly 200 in the housing 12. For example, the post 12E may receive a nut, screw, heat stake or the like to retain the cover assembly 200.

Figure 9:
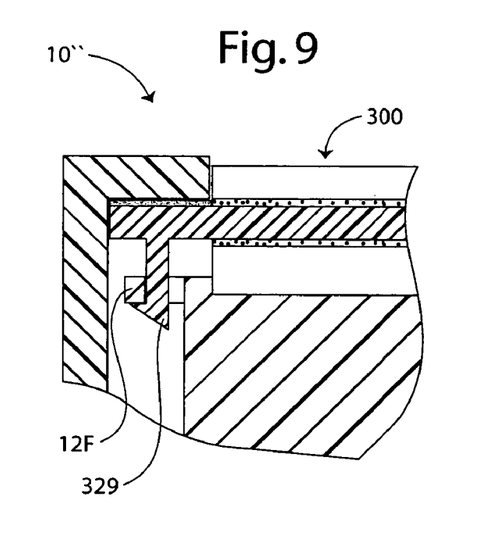
FIG. 9 is an enlarged, fragmentary, cross-sectional view of a mobile terminal according to further embodiments of the present invention.

By way of further example and with reference to FIG. 9, a mobile terminal 10" according to further embodiments of the invention is shown therein. The mobile terminal 10" corresponds to the mobile terminal 10 except that the mobile terminal 10" further includes a snap feature or hole 12F forming a part of the housing 12 and the cover assembly 100 is replaced with a cover assembly 300. The cover assembly 300 corresponds to the cover assembly 100 except that the cover assembly 300 includes a snap feature or member 329 that engages and interlocks with the snap feature 12F.

Display window cover assemblies in accordance with some embodiments of the present invention may provide various advantages. The glass panel may provide desirable or requisite hardness or scratch resistance while the plastic panel provides desired or required mounting features, cosmetic decoration, functional coatings or optical features, etc. The plastic panel may allow for the provision of a wide range of mounting features and/or decorative effects, which may be provided at a relatively a low cost. According to some embodiments, the plastic panel is decorated and the glass panel is not decorated.

The plastic panel may provide an anti-splinter or anti-shatter functionality to prevent or inhibit dispersion of the glass panel in the event the glass panel is broken. The composite display window cover may have increased impact resistance as compared to either a glass display window cover or a plastic display window cover. The composite display window cover may allow for a thinner product.

Although the electronic devices are discussed herein as being included as part of a mobile wireless communication terminal, for example, the mobile terminal 10 of FIGS. 5-7, embodiments of the present invention are not limited to this configuration. Various aspects of the present invention may be incorporated into other types of devices including, for example, mobile devices that are not wireless communication terminals or non-portable electronic devices.

Many alterations and modifications may be made by those having ordinary skill in the art, given the benefit of present disclosure, without departing from the spirit and scope of the invention. Therefore, it must be understood that the illustrated embodiments have been set forth only for the purposes of example, and that it should not be taken as limiting the invention as defined by the following claims. The following claims, therefore, are to be read to include not only the combination of elements which are literally set forth but all equivalent elements for performing substantially the same function in substantially the same way to obtain substantially the same result. The claims are thus to be understood to include what is specifically illustrated and described above, what is conceptually equivalent, and also what incorporates the essential idea of the invention.

We claim:

1. An electronic device having a display window and comprising:
   a composite display window cover assembly disposed in the display window, the composite display window cover assembly including a glass panel and a plastic panel secured to the glass panel and having a main portion and a planar border portion that is substantially coplanar with the main portion and extends laterally beyond a peripheral edge of the glass panel; and
   a display device positioned to be viewed through the display window and the composite display window cover assembly, wherein the electronic device includes a housing and the plastic panel is directly secured to the housing at the planar border portion.

2. The electronic device of claim 1 wherein the plastic panel has a thickness of at least about 0.30 mm.

3. The electronic device of claim 1 wherein the plastic panel is formed of a polymeric material having a Young's Modulus of at least about 1.8 GPa.

4. The electronic device of claim 1 wherein the plastic panel is interposed between the glass panel and the display device.

5. The electronic device of claim 1 wherein the plastic panel is laminated to the glass panel.

6. The electronic device of claim 1 wherein the plastic panel is laminated to the glass panel by a layer of adhesive interposed between the plastic panel and the glass panel.

7. The electronic device of claim 1 including a coating disposed on a surface of the plastic panel.

8. The electronic device of claim 1 wherein the glass panel overlies the main portions.

9. The electronic device of claim 1 wherein the plastic panel includes at least one integral mounting feature.

10. The electronic device of claim 9 wherein the at least one integral mounting feature includes at least one of a recess and a hole defined in the plastic panel.

11. The electronic device of claim 9 wherein the at least one integral mounting feature includes at least one of a post and a snap feature extending from the plastic panel.

12. The electronic device of claim 1 wherein the glass panel is formed of chemically hardened glass.

13. The electronic device of claim 1 wherein the plastic panel is formed of at least one of polycarbonate and acrylic.

14. The electronic device of claim 1 wherein the plastic panel is directly adhered to the display device by a layer of adhesive.

15. The electronic device of claim 14 wherein the display device is a liquid crystal display (LCD).

16. The electronic device of claim 1 wherein the plastic panel is directly ultrasonically welded to the housing.

17. The electronic device of claim 1 wherein the electronic device is a wireless communications device.

18. The electronic device of claim 1 wherein the electronic device is a handheld wireless communications device.

19. The method of claim 1, wherein the planar border portion is configured to underlap the housing.

20. A method for forming an electronic device, the method comprising:
   mounting a composite display window cover assembly in a display window of a housing such that the composite display window cover assembly overlies a display unit in the housing and the display unit is viewable through the composite display window cover assembly, wherein the composite display window cover assembly includes a glass panel and a plastic panel secured to the glass panel, wherein the plastic panel has a main portion that is secured to the glass panel and has a planar border portion that is substantially coplanar with the main portion and extends laterally beyond a peripheral edge of the glass panel, and wherein the electronic device includes a housing and the plastic panel is directly secured to the housing at the planar border portion.

21. The method of claim 20 further including laminating the plastic panel to the glass panel.

* * * * *

UNITED STATES PATENT AND TRADEMARK OFFICE
CERTIFICATE OF CORRECTION

PATENT NO.         : 7,463,734 B2
APPLICATION NO.  : 11/410553
DATED              : December 9, 2008
INVENTOR(S)        : Tolbert et al.

It is certified that error appears in the above-identified patent and that said Letters Patent is hereby corrected as shown below:

In the Claims:

Column 9, Claim 8, Line 37:  Please correct "the main portions"
                                              To read -- the main portion --

Signed and Sealed this

Seventeenth Day of February, 2009

JOHN DOLL
*Acting Director of the United States Patent and Trademark Office*